UNITED STATES PATENT OFFICE.

THEODOR KEMPF, OF BERLIN, ASSIGNOR TO DR. F. VON HEYDEN, NACHFOLGER, OF RADEBEUL, NEAR DRESDEN, GERMANY.

MANUFACTURE OF SALICYLIC ACID AND SUBSTITUTES THEREOF.

SPECIFICATION forming part of Letters Patent No. 355,875, dated January 11, 1887.

Application filed July 9, 1886. Serial No. 207,573. (No specimens.)

*To all whom it may concern:*

Be it known that I, THEODOR KEMPF, of Berlin, in the Kingdom of Prussia, Empire of Germany, have invented certain new and useful Improvements in the Manufacture of Salicylic Acid and of the Substitution Compounds and Homologues Thereof, of which the following is a specification.

Before explaining my invention I will first refer to the processes of manufacturing salicylic acid and the homologues and substitution compounds thereof described in the specifications of the two United States patents granted to Rudolf Schmitt, No. 334,290, dated January 12, 1886, and No. 338,365, dated March 23, 1886.

According to the directions given in both of those specifications, the autoclave, or vessel containing the dried phenolates of the alkalies and earthy alkalies, is kept well cooled while the contents are subjected to the action of carbonic acid under pressure, the object of this cooling being to enable the salt of the phenyl-carbonic ether to be formed at ordinary or atmospheric temperature, which salt is afterward converted into neutral or normal salicylic salt with exposure to a temperature of from about 120° to 145° centigrade.

I have now discovered that the process of manufacture can be simplified by combining these two stages of the process in one and converting the salt of the phenyl-carbonic ether directly into salicylic salt while in the nascent condition.

My invention consists in subjecting the phenolates to the action of the carbonic acid under pressure in a closed vessel at a temperature of from 120° to 145° centigrade, whereby I dispense with the preliminary operation for the production of the salt of the phenyl-carbonic ether at low or atmospheric temperature and effect both the production of the said salt and its conversion into the salicylic salt by one continuous operation—that is to say, by dispensing altogether with the first stage of the processes hereinabove referred to, consisting of treating the phenolates with the carbonic acid at a low temperature, and effecting the whole of the treatment at a high temperature; and my invention is a process whereby this discovery which I have made is utilized, said process consisting in subjecting the phenolates to the action of carbonic acid under pressure and at a high temperature without the previous treatment at a low temperature, and thereby effecting the production of the salt of the phenyl-carbonic ether and its conversion while in a nascent state into the salicylic salt by a single operation or treatment, with a great saving of time and expense.

In carrying out my invention the closed vessel in which the process is performed is kept heated in an air-bath throughout the entire process, and the carbonic acid is introduced into the material while it is thus heated. The temperature should be maintained throughout the process at about from 120° to 145° centigrade, and special care must be taken not to allow it to greatly exceed these limits; otherwise phenol would be separated and the process would then be completed as described in the specification to Letters Patent granted to Dr. Kolbe in the year 1874. Corresponding results are obtained by the treatment of the homologues and substitution compounds of phenol.

What I claim as my invention is—

The improved process for the manufacture of salicylic acid and of the substitutes and homologues thereof from the phenolates of the alkalies and earthy alkalies and the substituted phenolates of said alkalies and earthy alkalies, consisting in subjecting the said phenolates to the action of carbonic acid under pressure at a temperature of about from 120° to 145° centigrade without previous treatment at a low or ordinary temperature, whereby phenyl-carbonic ether is first produced and while in a nascent state is converted into the salicylic salt or its homologue or substitute at one operation or treatment, substantially as herein described.

In testimony that I claim the foregoing as my invention I have signed my name in presence of two subscribing witnesses.

THEODOR KEMPF.

Witnesses:
M. W. MOORE,
B. ROI.